T. J. NASH.
HIGH PRESSURE COOKING UTENSIL.
APPLICATION FILED OCT. 15, 1913.
1,125,371.
Patented Jan. 19, 1915.
2 SHEETS—SHEET 1.
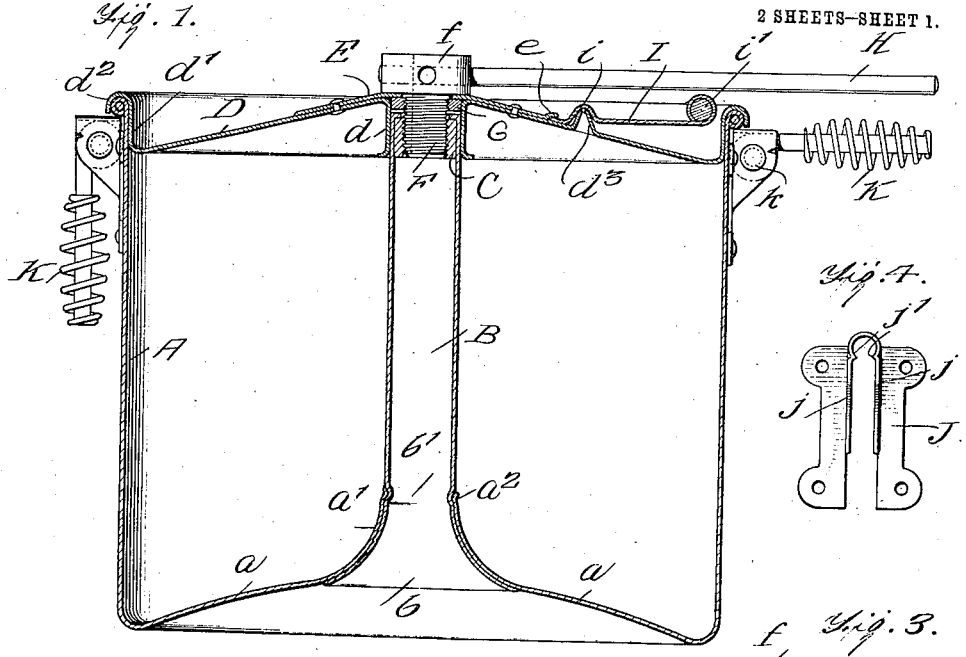
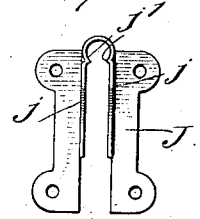
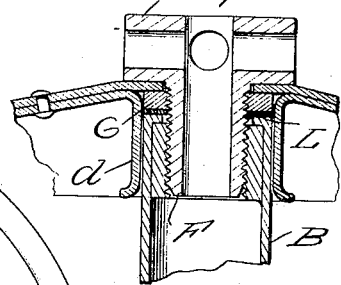
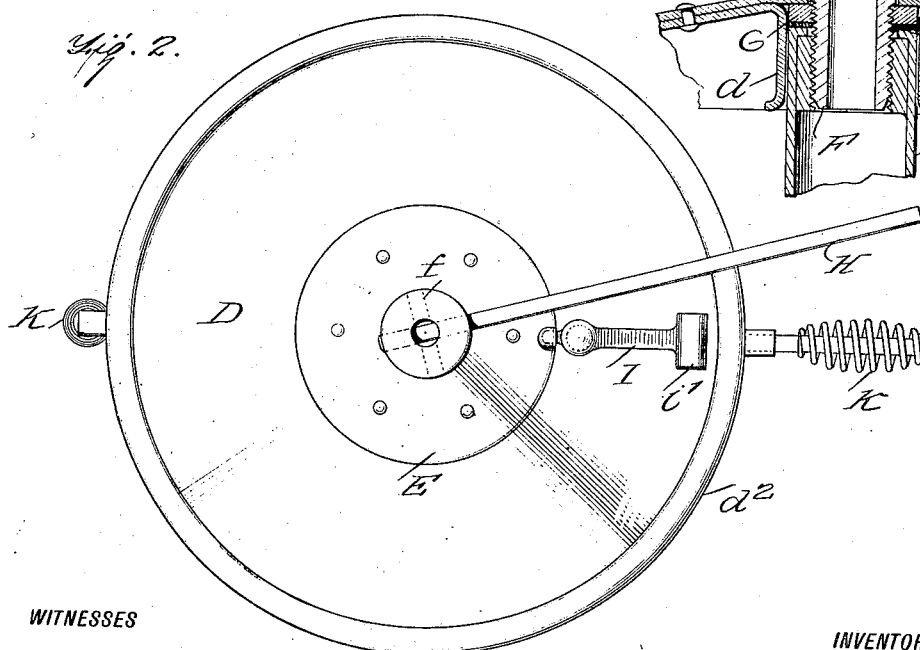
WITNESSES
INVENTOR
THOMAS J. NASH,
BY
ATTORNEYS T. J. NASH.
HIGH PRESSURE COOKING UTENSIL.
APPLICATION FILED OCT. 15, 1913.
1,125,371.
Patented Jan. 19, 1915.
2 SHEETS—SHEET 2.
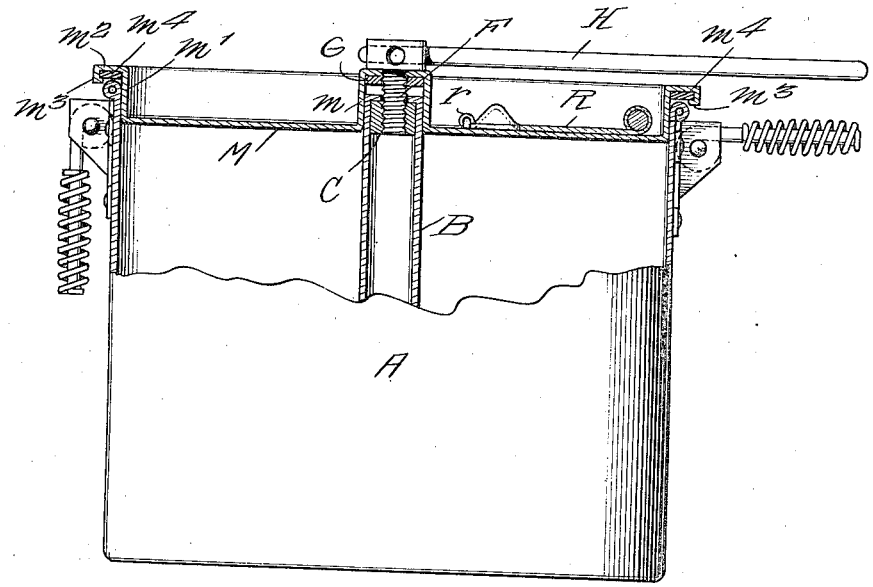
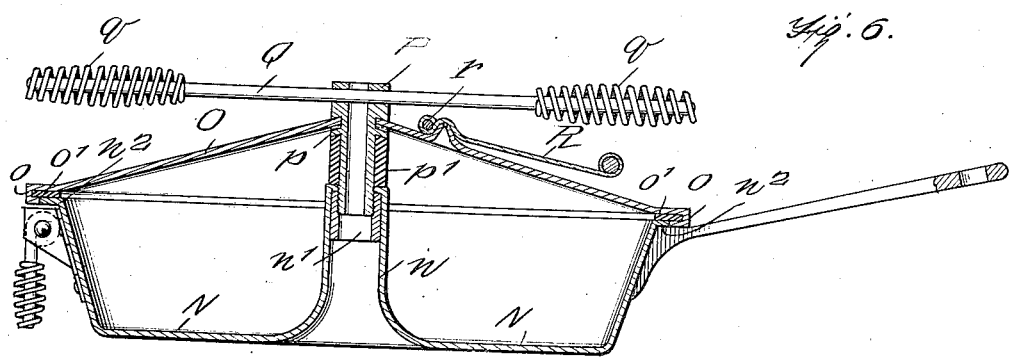
WITNESSES
INVENTOR
THOMAS J. NASH,
BY Munn & Co.
ATTORNEYS

UNITED STATES PATENT OFFICE.

THOMAS J. NASH, OF LINCOLN, NEBRASKA.

HIGH-PRESSURE COOKING UTENSIL.

1,125,371.  Specification of Letters Patent.  Patented Jan. 19, 1915.

Application filed October 15, 1913. Serial No. 795,292.

*To all whom it may concern:*

Be it known that I, THOMAS J. NASH, a citizen of the United States, and a resident of Lincoln, in the county of Lancaster and State of Nebraska, have invented an Improvement in High-Pressure Cooking Utensils, of which the following is a specification.

My present invention relates to cooking utensils and contemplates the provision of a cooking utensil with a body and a cover together with certain novel arrangements thereof and means for evenly and tightly securing the cover upon the body whereby to render the same fluid and odor tight. By these means I seek to obtain a higher temperature and to retain all of the odor, flavor and nutriment in the food and conserve the full amount of liquid within the utensil in order that it may be continuously utilized during the cooking operation.

With the above in mind my invention resides in the features of construction, arrangement and operation to be now described with reference to the accompanying drawings in which, Figure 1, is a central vertical sectional view taken through my improved cooking utensil. Fig. 2, is a top plan view thereof. Fig. 3, is an enlarged vertical section through the upper central portion thereof. Fig. 4, is an elevation of one of the handle brackets. Fig. 5, is a side view, partly broken away and in section illustrating a slightly modified form of the utensil shown in Fig. 1, and Fig. 6, is a central vertical section taken through another modification of my invention in which it is adapted to a frying pan.

Referring now to these figures, and more particularly to Figs. 1 to 4 inclusive, I provide a cooking utensil consisting of a body A, the concaved base $a$ of which is provided with a central tubular portion $a'$ which receives the lower flaring end $b$ of a central tube B, those portions as indicated at $a^2$ and $b'$ respectively of the base tube $a'$ and tube B being crimped together in order to firmly unite the parts. The upper end of the tube B is provided with an inwardly projecting annular flange and houses an internally threaded sleeve C which forms a nut, it being noted that the upper end of the tube terminates slightly below the plane of the upper edge of the body A which is preferably curled in order to reinforce the same either with or without an internal rib.

The cover D is substantially cone-shaped, its inner portion being provided with a dependent tube $d$ which in the assembled position of the parts receives the upper end of the tube B, the outer circular edge of the cover being provided with an upwardly projecting annular rim $d'$ having an outwardly and downwardly curved flange $d^2$, it being noted from Fig. 1 that in the assembled position of the parts the rim $d'$ bears against the inner face of the body adjacent its upper edge and the flange $d^2$ bears upon the reinforced body rim.

Upon its outer surface the cover D is provided with a supplemental central piece E, this piece having a central opening of less diameter than the tubular portion $d$ of the cover and being adapted to receive therethrough the upper portion of the shank of a screw F, the upper head $f$ of which rests upon the outer surface of plate E. A washer G is mounted on the screw F and disposed against the inner surface of plate E whereby the screw may be turned with respect to the cover and at the same time prevented from relative longitudinal movement.

The upper head $f$ of the screw F is provided with transverse openings to receive one end of a readily detachable handle H whereby the screw may be turned to move its shank within the nut C, the effect of which is to firmly and tightly set the cover on the body.

At one side of the supplemental plate E, its extreme outer edge is up set as indicated at $e$ to receive one end of a lever I, this lever being provided adjacent said end with a boss $i$ seated upon an apertured boss $d^3$ of the cover, the opposite end of the lever having a weight $i'$ for the purpose of holding it in proper position, the engaged forward end of the lever and the up set portion $e$ of the plate E forming a pivot.

At relatively opposite sides of the body are arranged handle brackets J, having parallel vertically projecting side ears $j$, through which is extended a transverse pivot bolt $k$, these side ears being connected at their upper ends and provided adjacent their said upper connected ends with indented portions, as particularly shown at j′ whereby when the handles K, the inner ends of which are bent around the bolt k between the ears, are raised to horizontal position, the said indented portion j will serve to retain the same in place as indicated at the right of Figs. 1, 2 and 5.

As indicated in Fig. 3, a washer L of fiber, rubber or other suitable material may be inserted between the lower face of the washer or clamping ring G and the upper end of the tube B in order to additionally guard against leakage.

In the form of my invention as illustrated in Fig. 5, the body A and tube B are constructed precisely as described in connection with Figs. 1 and 2, the cover M as shown in this figure being substantially flat, however, and provided with a central upwardly projecting tubular portion m through the upper apertured end of which the shank of the screw F is extended, the washer or clamping ring being utilized to prevent disengagement of these parts and the shank of the screw engaging the nut C held within the tube in the manner previously described. The outer edge of the cover M has an annular vertical rim m′ at the upper end of which is an outwardly projecting annular flange m² terminating in a dependent outer edge m³ whereby to adapt the same to the reception of a gasket ring m⁴ which engages the upper reinforced edge of the body A.

In Fig. 6, I have adapted my invention to a frying pan, the body N of which is provided with a central vertically projecting tube n the upper edge of which has an inwardly projecting flange, a nut n′ being inclosed by the upper flanged end of the tube n. The cover O is substantially cone-shaped, its outer edge being flattened and provided with depending and inwardly projecting flanges as shown at o whereby to inclose a gasket ring o′ for bearing against the flange n² of the body. The cover is also provided with a central opening through which the upper end of the screw P projects, this screw having a shoulder p below the cover and between which and the upper end of the tube n, is disposed a washer p′ of suitable material.

It will be noted that the upper heads of the screws as shown in the several figures are similarly apertured to receive handles, and it is to be understood that the handle may either be in the form of a rod, either end of which is adapted for detachable engagement with the screw head, or in more permanent form as indicated at Q in Fig. 6, this rod having handles q at opposite ends and intermediately engaging the screw. It is also to be noted that inasmuch as the supplemental piece E is done away with in the form shown in Figs. 5 and 6, it is necessary to provide a valve lever R in these forms which is slightly different from the valve lever I insofar as the connection of its inner end, valve levers R having their inner ends pivoted at r on the cover itself.

Thus from the foregoing it may be seen that I provide a high pressure cooking utensil which by a simple operation of connecting the cover upon the body, may be rendered fluid and odor tight, and wherein a greatly increased temperature may be obtained and the contents thoroughly cooked more quickly than is at present possible. It is to be noted also that the levers I and R may be so regulated by proper weights at their outer ends that they will relieve the pressure within the utensil when it rises above either a desired point or a safe one.

I claim:—

1. In a cooking utensil the combination of a body having an upwardly projecting central tube, open at its upper end, an internally threaded sleeve forming a nut and housed in the upper end of the tube, a cover for the body having its outer edge formed to snugly fit the upper edge of the body and provided with a central opening, a screw having an upper head resting on the cover and a threaded shank depending through the cover opening and provided with means whereby to prevent longitudinal movement with respect to the cover, the threaded shank of said screw being adapted for engagement with the nut, and a handle for turning the screw adapted for engagement with its upper headed end.

2. In a cooking utensil the combination of a body having an upwardly projecting central tube, open at its upper end, an internally threaded sleeve forming a nut and housed in the upper end of the tube, a cover for the body having its outer edge formed to snugly fit the upper edge of the body and provided with a central opening, a screw having an upper head resting on the cover and a threaded shank depending through the cover opening and provided with means whereby to prevent longitudinal movement with respect to the cover, the threaded shank of said screw being adapted for engagement with the nut, and a handle for turning the screw adapted for engagement with its upper headed end and a pressure relief valve on the cover, all for the purpose described.

3. In a cooking utensil, the combination of a body provided with a central vertical tube and an internally threaded sleeve housed in the upper end of the tube and forming a nut, a cover having its outer edge formed to snugly fit the upper edge of the body and having a central tubular portion to receive the upper end of the tube, a screw having an upper headed end and having its shank projecting inwardly through the tubular portion of the cover for engagement with the nut of the body, and a handle for operating the screw, all for the purpose described.

4. In a cooking utensil of the character described the combination of a body having a central vertical tube and a nut housed within the upper end of the tube, a cover having a flanged outer edge for engagement with the upper edge of the body and provided with a central opening, a screw depending through the cover opening and having an outer headed end resting on the cover, a clamping ring threaded on the screw beneath the cover whereby to prevent disengagement of the screw from the cover, all for the purpose described.

5. In a cooking utensil of the character described, the combination of a body having a central vertical tube open at its lower end through the base of the body and also open at its upper end, a cover having its outer edge formed to closely fit the upper edge of the body and provided with a central opening, a screw depending through the cover opening and adapted to threadedly engage a nut in the upper end of the body tube, and a head formed on the upper end of the screw and seated upon the cover around its opening, all for the purpose described.

THOMAS J. NASH.

Witnesses:
JAMES L. BROWN,
MABEL C. SMITH.